United States Patent
Bauer et al.

(10) Patent No.: US 7,180,863 B1
(45) Date of Patent: Feb. 20, 2007

(54) METHOD AND APPARATUS FOR OVERLOAD CONTROL IN MULTI-BRANCH PACKET NETWORKS

(75) Inventors: Eric Jonathan Bauer, Freehold, NJ (US); Wassim A. Matragi, Brooklyn, NY (US); Behrokh Samadi, Basking Ridge, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/488,182

(22) Filed: Jan. 20, 2000

(51) Int. Cl.
*H04L 12/26* (2006.01)
*H04L 12/66* (2006.01)

(52) U.S. Cl. ..................... 370/237; 370/352
(58) Field of Classification Search ........ 370/352–356, 370/237
See application file for complete search history.

(56) References Cited

U.S. PATENT DOCUMENTS

| | | | |
|---|---|---|---|
| 5,787,347 A * | 7/1998 | Yu et al. ............... | 455/440 |
| 5,790,522 A * | 8/1998 | Fichou et al. .......... | 370/236 |
| 6,006,259 A * | 12/1999 | Adelman et al. ....... | 709/223 |
| 6,292,910 B1 * | 9/2001 | Cummins ............... | 714/43 |
| 6,389,005 B1 * | 5/2002 | Cruickshank .......... | 370/352 |
| 2001/0003522 A1 | 6/2001 | Masuhiro | |

FOREIGN PATENT DOCUMENTS

EP    0920176 A2    6/1999

\* cited by examiner

*Primary Examiner*—Chi Pham
*Assistant Examiner*—Ronald Abelson
(74) *Attorney, Agent, or Firm*—Ryan, Mason & Lewis, LLP

(57) ABSTRACT

A method and apparatus are disclosed for congestion management in a multi-branch Internet Protocol-based private branch exchange switch. The multi-branch Internet Protocol-based private branch exchange switch is interconnected through (i) a packet network referred to as the primary network, such as a wide area network, and (ii) an alternate network, such as the public switched telephone network. Packet phone adapters associated with each packet telephone unit monitor packet telephone calls and report delay information to communication servers. The communication server can reroute the packet telephony calls through the secondary network upon detection of congestion in the underlying primary network, thereby preserving voice quality. The packet phone adapter will discard records collected from calls whose duration is below a minimum value, to ensure reliable congestion information. Each communication server records reported voice quality of service information in a congestion control database. An overload control process processes each call set up request and determines if the requested path is congested. If a requested path is congested, then the overload control process may forward the call using the secondary network.

4 Claims, 6 Drawing Sheets

FIG. 5

CONGESTION CONTROL DATABASE
500

| TO/FROM | SITE 1 | SITE 2 | ... | SITE N |
|---|---|---|---|---|
| SITE 1 | TIMER | TIMER | ... | TIMER = 3M |
| | CI | CI | ... | CI = 1 |
| SITE 2 | TIMER | TIMER | ... | TIMER |
| | CI | CI | ... | CI |
| ... | ... | ... | ... | ... |
| SITE N | TIMER = 3M | TIMER = 1M | ... | TIMER |
| | CI = 1 | CI = 1 | ... | CI |

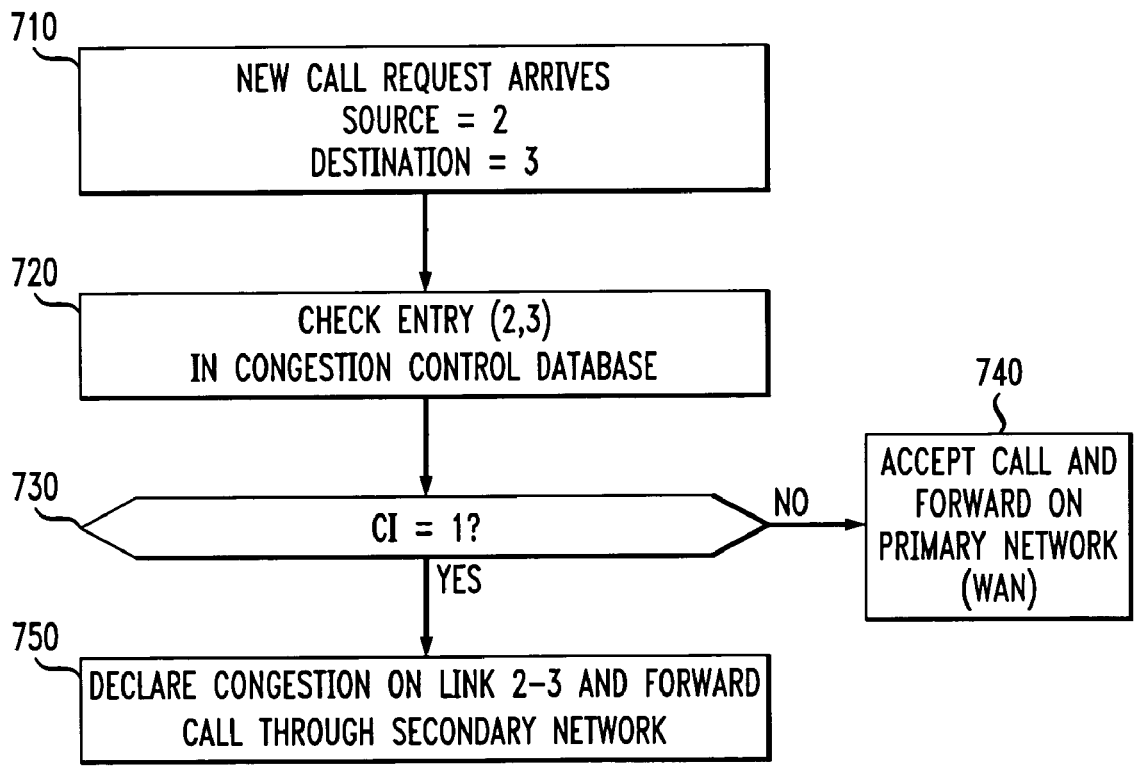

METHOD AND APPARATUS FOR OVERLOAD CONTROL IN MULTI-BRANCH PACKET NETWORKS

FIELD OF THE INVENTION

The present invention relates to voice packet communication systems, and more particularly, to method and apparatus for congestion management in a multi-branch voice packet network, such as the Internet Protocol (IP)-based private branch exchange (PBX) switch.

BACKGROUND OF THE INVENTION

Communication networks are used to transfer information, such as data, voice, text or video information, among communication devices, such as packet telephones, computer terminals, multimedia workstations, and videophones, connected to the networks. A network typically comprises nodes connected to each other, and to communication devices, by various links. Within a corporate environment, telephone service has typically been provided by a private branch exchange switch. Generally, a private branch exchange switch is an on-site facility that is typically owned or leased by a company or another entity. The private branch exchange switch interconnects the telephones within the facility and provides access to the Public Switched Telephone Network (PSTN).

Information sent from a communication device to a network may be of any form, but is often formatted into fixed-length packets or cells. Packet-switching network architectures are widely used, for example, in popular local-area network (LAN) and wide area network (WAN) protocols, such as Ethernet and asynchronous transfer mode (ATM) protocols. In a packet-switched network, data transmissions are typically divided into blocks of data, called packets, for transmission through the network. For a packet to get to its proper destination, the packet must traverse through one or more network switches, routers or intermediate systems. Increasingly, such packet telephony systems are being utilized in corporate environments.

Unlike a conventional private branch exchange environment, which is based on the circuit switching concept, i.e., each phone conversation gets a dedicated circuit, the packet data network used by the packet telephony system is typically shared with other network applications, such as web browsers, electronic mail, file and print servers. This mix of voice and data applications on the same packet network might result in a degradation of the voice quality due to packet loss, delay and jitter. In order to protect voice applications, a higher priority is typically given to voice packets in various elements of the packet network infrastructure (if allowed by the network infrastructure). However, even with this increased priority, random congestion might take place in different parts of the packet network, and specifically at the wide area network access links or within the wide area network itself. When congestion takes place, the packet telephony users are, in a sense, at the mercy of the network and the various applications running on the network. There is little, if anything, that the packet telephony administrator can do to improve the voice quality when the underlying packet network is congested.

As apparent from the above-described deficiencies with conventional systems for overload control, a need exists for an improved method and apparatus for overload control in a multi-branch packet network, such as an Internet Protocol-based private branch exchange switch. A further need exists for an overload control method and apparatus that reroutes packet telephone calls using an alternate branch in a multi-branch packet network, upon detection of congestion in a primary branch.

SUMMARY OF THE INVENTION

Generally, a method and apparatus are disclosed for congestion management in a multi-branch packet network, such as Internet Protocol-based private branch exchange switch. The multi-branch packet network includes paths through a primary network, such as a wide area network, and an alternate network, such as the public switched telephone network, for interconnecting packet telephones located at two locations.

According to one aspect of the invention, packet phone adapters (PPAs) associated with each packet telephone unit monitor packet telephone calls and periodically report delay information to communication servers. In one preferred embodiment, the communication server will reroute the packet telephony calls through the secondary network upon detection of congestion in the underlying primary packet network, thereby preserving voice quality.

Each packet phone adapter includes a congestion data collection and reporting process that monitors each phone call on the primary network and reports delay information to the communication server. In one embodiment, the packet phone adapter will discard records collected from calls whose duration is below a minimum value, to ensure reliable congestion information. Each communication server includes a congestion control database maintenance process that records reported delay information from the packet phone adapters in a congestion control database, and an overload control process that processes each call set up request and determines if the requested path is congested. If the requested path is congested, then the overload control process may forward the call using the secondary network.

A more complete understanding of the present invention, as well as further features and advantages of the present invention, will be obtained by reference to the following detailed description and drawings.

BRIEF DESCRIPTION OF THE DRAWINGS

FIG. 5 is a sample table from the congestion control database of FIG. 3;

FIG. 7 is a flow chart describing an exemplary overload control process implemented by the communication server of FIG. 3 in accordance with the present invention.

DETAILED DESCRIPTION

Figure 1:
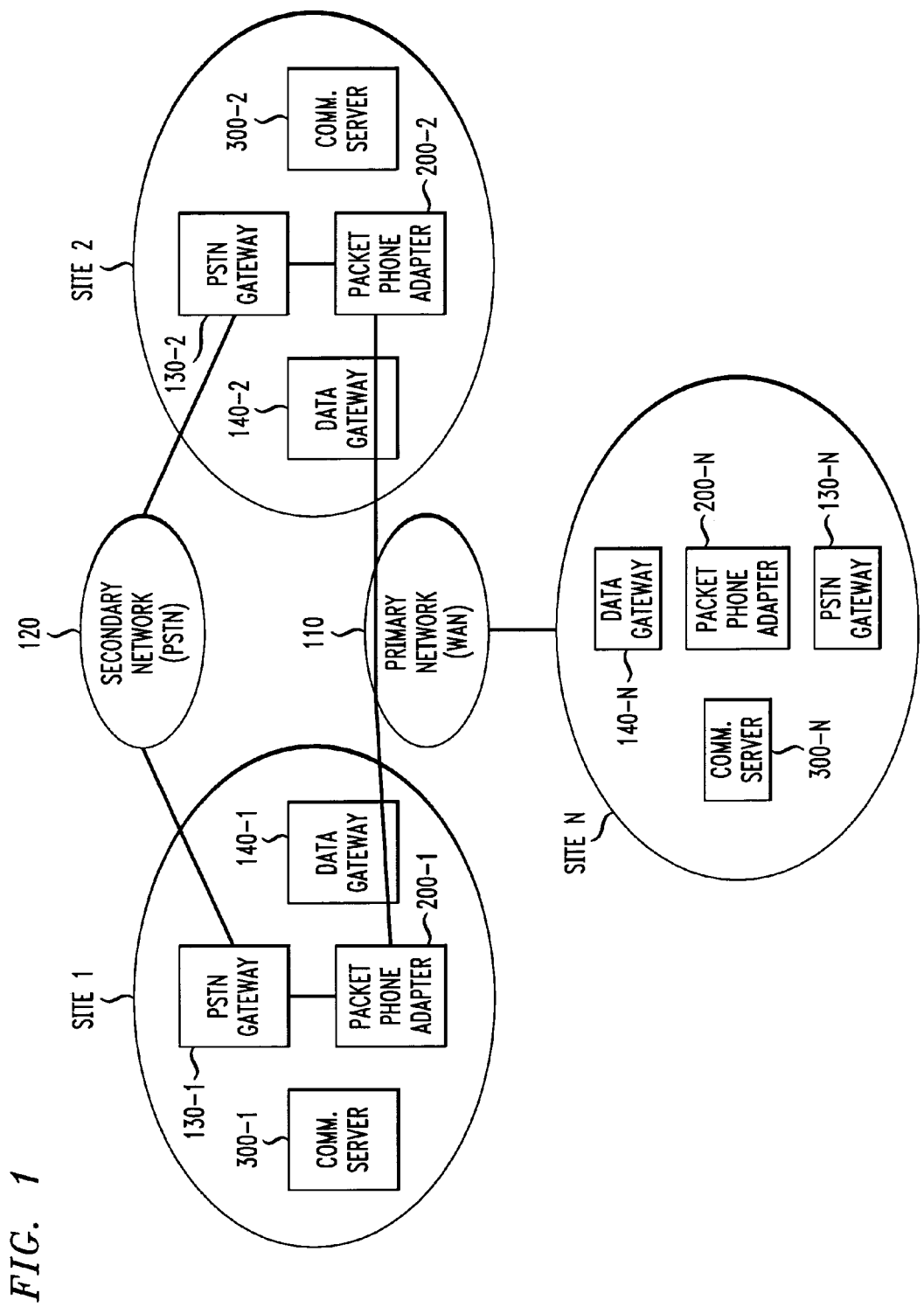
FIG. 1 illustrates a network environment in which the present invention can operate.

FIG. 1 illustrates a network environment 100 in which the present invention can operate. As shown in FIG. 1, the illustrative network environment 100 includes a primary network, such as a packet data wide area network 110, and an alternate network, such as the public circuit switched telephone network 120. According to one feature of the present invention, if congestion is detected on the primary network 110, the call can be rerouted on the alternate network 120. As shown in FIG. 1, the network environment 100 connects a number of packet phone adapters 200-N, discussed below in conjunction with FIG. 2, and communication servers 300, discussed below in conjunction with FIG. 3. Typically, each individual site N in the wide area network environment 100 includes a communication server 300-N, although not necessary, a public switched telephone network gateway 130-N, in a known manner, and a data gateway 140-N, often referred to as a router. It is noted that while each individual site N in the wide area network environment 100 is shown in FIG. 1 as including only a single packet phone adapters 200-N for clarity of illustration, each site N would typically include multiple packet phone adapters 200-N.

As discussed further below, the packet phone adapters 200 convert the analog voice signals generated by telephone sets into digital signals that are encapsulated into Real Time Transport Protocol/Unreliable Datagram Protocol/Internet Protocol (RTP/UDP/IP) packets. Upon the establishment of a phone call between a packet phone adapters 200 and an end device, the packet phone adapter 200 terminates a Real Time Transport Protocol/Unreliable Datagram Protocol/Internet Protocol stream. The communication servers 300 are responsible for the call processing functions, authentication, billing and management, in a known manner.

According to one feature of the present invention, each packet phone adapter 200 monitors the phone calls in which it participates and reports delay information to the communication server 300. The communication server 300, upon detection of congestion in the underlying primary network 110, will reroute the packet telephony calls through the secondary network 120, such as the public switched telephone network. In this manner, voice quality is preserved as the phone conversation is being conducted on a reliable public switched telephone network connection compared to an unreliable connection through a public data network.

Figure 2:
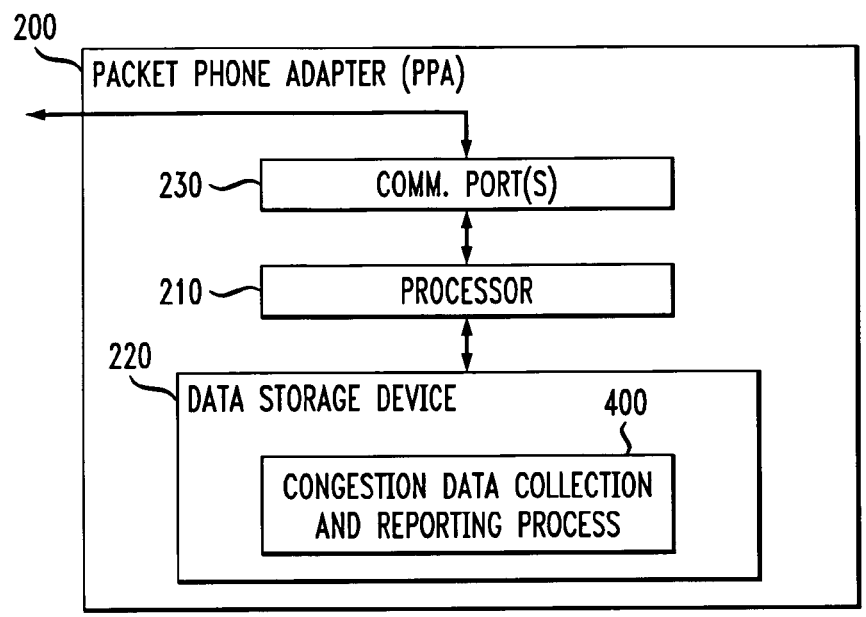
FIG. 2 is a schematic block diagram of a packet phone adapter of FIG. 1 in accordance with the present invention.

FIG. 2 is a schematic block diagram of an illustrative packet phone adapter 200. As shown in FIG. 2, the packet phone adapter 200 includes certain hardware components, such as a processor 210, a data storage device 220, and one or more communications ports 230. The processor 210 can be linked to each of the other listed elements, either by means of a shared data bus, or dedicated connections, as shown in FIG. 2. The communications port(s) 230 allow(s) the packet phone adapter 200 to communicate with all of the other network nodes over the primary network 110 and the secondary network 120, via the gateway 130.

The data storage device 220 is operable to store one or more instructions, discussed further below in conjunction with FIG. 4, which the processor 210 is operable to retrieve, interpret and execute in accordance with the present invention. Thus, the data storage device 220 includes a congestion data collection and reporting process 400 that monitors each phone call on the primary network 110 and reports delay information to the communication server 300. In one embodiment, discussed further below, in order to provide reliable information to the communication server 300, the packet phone adapter 200 will discard records collected from calls whose duration is below a minimum value, such as at least 1000 samples. For example, if the coder/decoder (codec) in the packet phone adapter 200 generates 30 millisecond (msec) packets, the minimum reported call duration should be at least 30 seconds.

Figure 3:
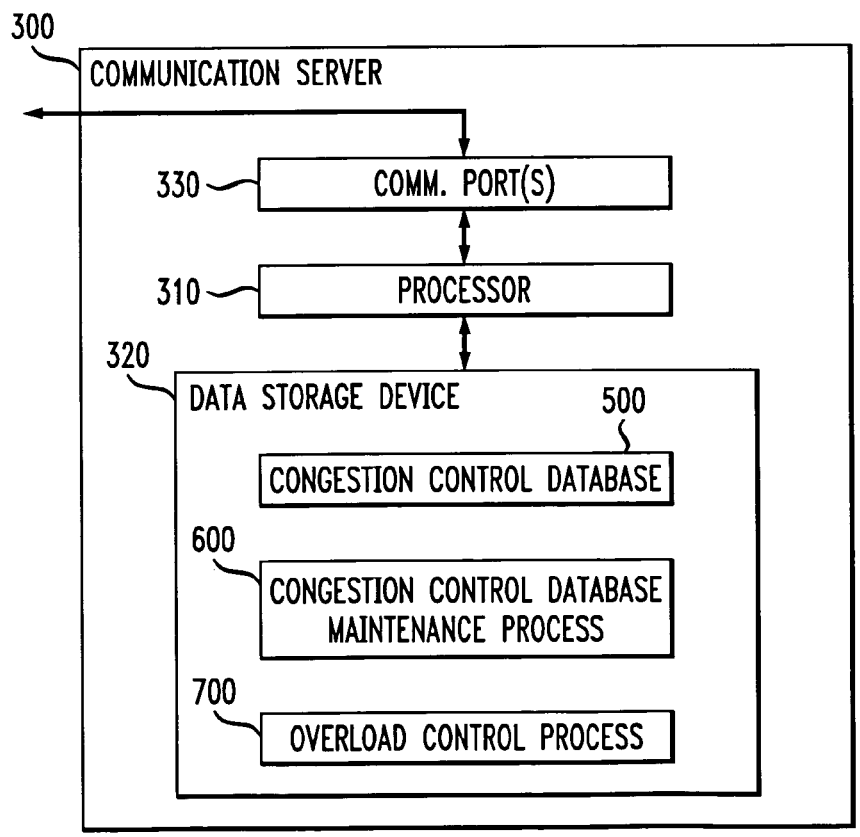
FIG. 3 is a schematic block diagram of a communication server of FIG. 1 in accordance with the present invention.

FIG. 3 is a schematic block diagram of an illustrative communication server 300. As shown in FIG. 3, the communication server 300 includes certain hardware components, such as a processor 310, a data storage device 320, and one or more communications ports 330, in the same manner as the packet phone adapter 200 of FIG. 2.

The data storage device 320 includes a congestion control database 500, discussed below in conjunction with FIG. 5. Generally, the congestion control database 500 contains an entry for each path between each site and indicates whether the corresponding path is congested.

The data storage device 320 is also operable to store one or more instructions, discussed further below in conjunction with FIGS. 6 and 7, which the processor 310 is operable to retrieve, interpret and execute in accordance with the present invention. The data storage device 320 includes a congestion control database maintenance process 600, discussed below in conjunction with FIG. 6, and an overload control process 700, discussed below in conjunction with FIG. 7. Generally, the congestion control database maintenance process 600 records reported delay information from the packet phone adapters 200 in the congestion control database 500. The overload control process 700 processes each call set up request and determines if the requested path is congested. If the requested path is congested, then the overload control process 700 will forward the call using the secondary network 120.

Figure 4:
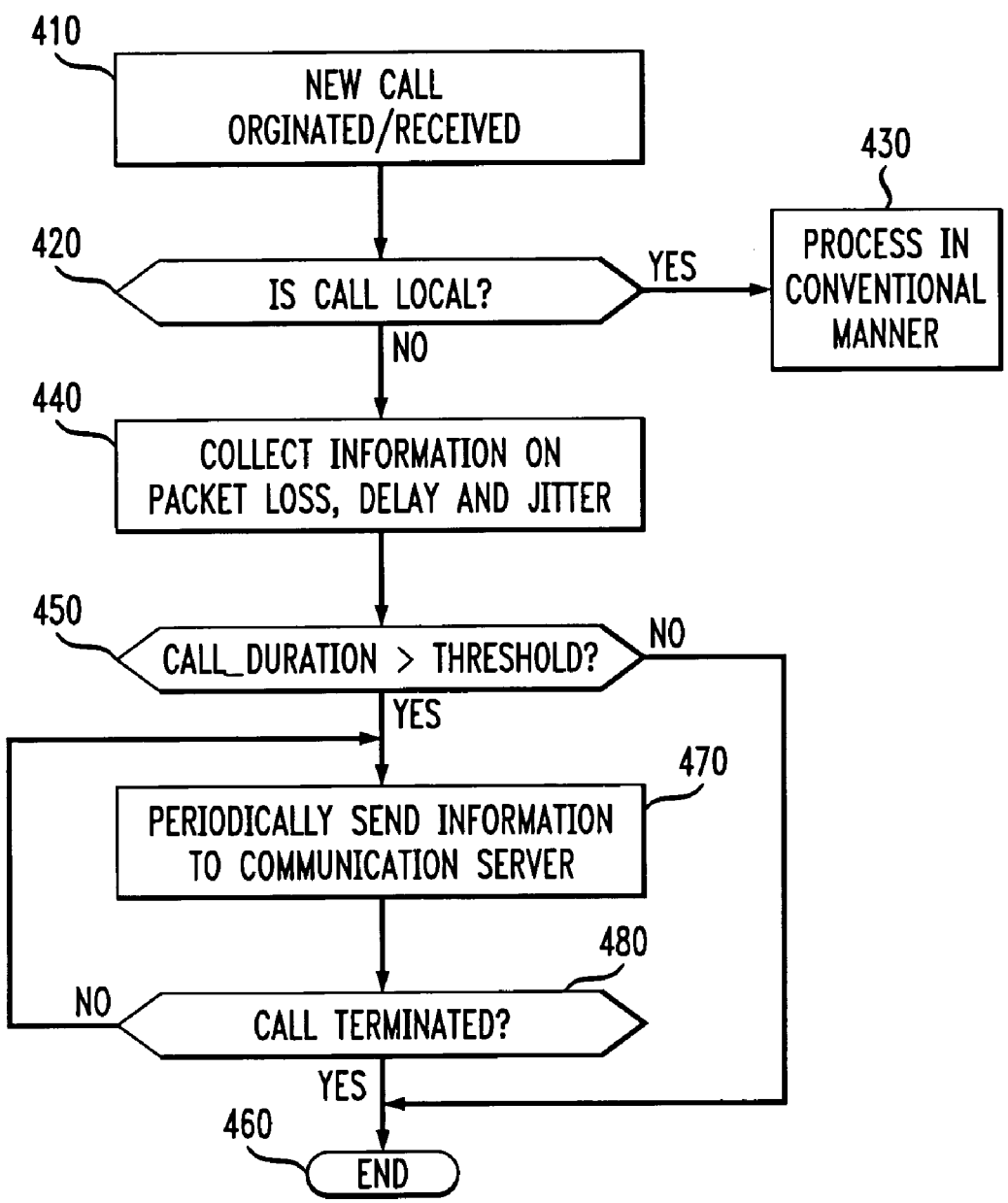
FIG. 4 is a flow chart describing an exemplary congestion data collection and reporting process implemented by the packet phone adapter of FIG. 2 in accordance with the present invention.

FIG. 4 is a flow chart describing an exemplary congestion data collection and reporting process 400 incorporating features of the present invention and employed by the packet phone adapter 200 of FIG. 2. As previously indicated, the congestion data collection and reporting process 400, shown in FIG. 4, monitors each phone call on the primary network 110 and reports delay information to the communication server 300. In the illustrative embodiment, the packet phone adapter 200 discards records collected from calls whose duration is below a minimum value, such as at least 1000 samples, in order to provide sufficiently reliable information to the communication server 300.

As shown in FIG. 4, the congestion data collection and reporting process 400 is initiated during step 410 upon the receipt of a new call being originated or received by the packet phone adapter 200. A test is then performed during step 420 to determine if the originated or received call is local (origination and destination of call on same site N). It is possible to know this information from the called number and the callee numbers. There are two possible cases when placing the call. In the first case, the packet phone adapter 200 is placing the call to another packet phone adapter 200 situated in the same site N. Therefore, the call is not traversing a private corporate wide area network or the public Internet through a relatively slow access link, or a potentially congested router. It is anticipated that in this case, the call will experience very little congestion, as the bandwidth in a local area network is plentiful. In the second case, however, the packet phone adapter 200 is placing calls to a packet phone adapter 200 located across the wide area network, such as at site 2. In this second case, the packets may be subject to delays and losses as they traverse a slow access link and the wide area network.

Thus, if it is determined during step 420 that the originated or received call is local, then the phone call is processed in a conventional manner during step 430. In other words, the packet phone adapter 200 will not collect any information about the quality of the on-going call. If, however, it is determined during step 420 that the originated or received call is not local, then the congestion data collection and reporting process 400 begins collecting information about packet loss, delay and jitter for the call during step 440. It is noted that during a conversation the packet phone adapter 200 terminates a Real Time Protocol stream, which carries the voice packets. The packet phone adapter 200 also terminates the Real Time Protocol stream, which gives information about the packet loss rate, delay and jitter.

Once the call is complete, a test is performed during step 450 to determine if the call duration exceeds a predefined threshold. In order to provide reliable information to the communication server 300, the packet phone adapter 200 will discard records collected from calls whose duration is below a minimum value. It has been found that the collection of at least 1000 samples, for example, provides satisfactory results. Thus, if the coder/decoder (codec) is generating 30 ms packets, the call duration should be at least 30 s.

If it is determined during step 450 that the call duration does not exceed the predefined threshold, then program control terminates during step 460. If, however, it is determined during step 450 that the call duration does exceed the predefined threshold, then the information being collected about packet loss and jitter for the call during step 440 is periodically reported to the communication server 300 during step 470, until it is detected during step 480 that the call has been terminated. Thereafter, program control terminates. Thus, throughout the duration of the call, information about packet loss, delay and jitter is periodically reported to the communication server 300. The period may be, for example, 3 minutes.

As previously indicated, the communication server 300 maintains a congestion control database 500, shown in FIG. 5. The congestion control database 500 contains an entry for each path between each site N and indicates whether or not the corresponding path is congested. In the illustrative implementation shown in FIG. 5, each entry of the congestion control database 500 includes a congestion indicator (CI) flag and a corresponding timer. If the congestion indicator flag is set, it indicates that the corresponding path is congested. Each time a flag is set, the corresponding timer is set to a predefined value. As discussed further below in conjunction with FIG. 6, the congestion indicator flag remains set for the path until the timer expires. It is noted that the congestion control database 500 does not identify specifically where the congestion occurs along the end-to-end path. For example, the congestion control database 500 does not specify whether congestion in the path between sites 1 and 3 occurs in the access gateway 140-1 in Site 1, or in the access link from Site 1 to the wide area network, in the wide area network itself or in the access link from the wide area network to Site 3 or in the access gateway 140-3 in Site 3. Rather, the congestion control database 500 indicates that the end-to-end path from Site 1 to Site 3 is congested and hence should be avoided by future calls whose source and destination happen to be between site 1 and site 3.

Figure 6:
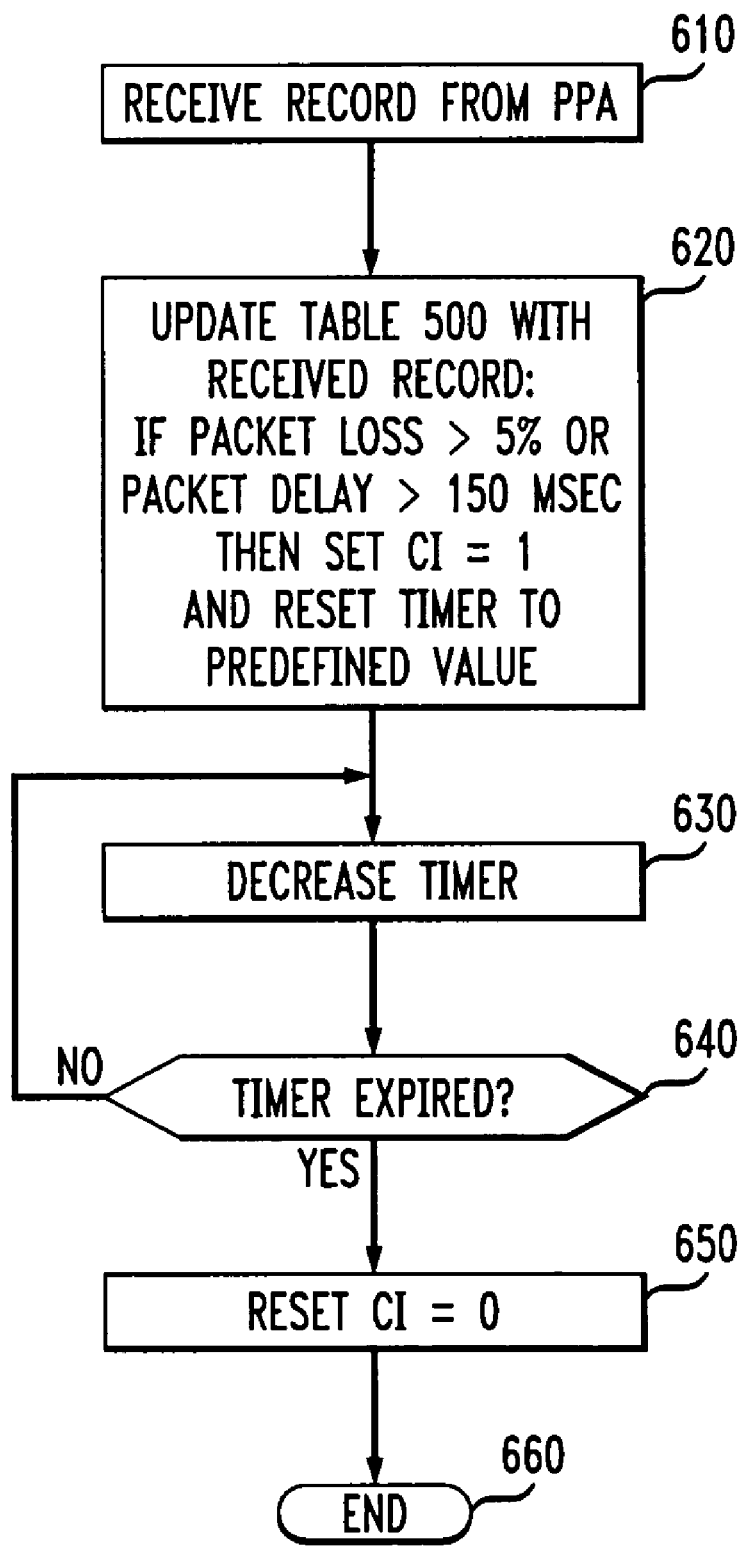
FIG. 6 is a flow chart describing an exemplary congestion control database maintenance process implemented by the communication server of FIG. 3 in accordance with the present invention.

FIG. 6 is a flow chart describing an exemplary congestion control database maintenance process 600 incorporating features of the present invention and employed by the communication server 300 shown in FIG. 3. As previously indicated, the congestion control database maintenance process 600 records reported delay information received from the packet phone adapters 200 in the congestion control database 500.

As shown in FIG. 6, the congestion control database maintenance process 600 is initiated during step 610 upon receipt of a record from a packet phone adapter 200. The congestion control database maintenance process 600 then evaluates the received record and sets the congestion indicator flag in the corresponding entry of the congestion control database 500 during step 620 if the record indicates that the packet phone adapter 200 experienced a packet loss of more than five percent (5%) or a packet delay of more than 150 milliseconds (msec). It is noted that the threshold values utilized during step 620 are merely for illustration and can be established experimentally. If the congestion control database maintenance process 600 sets the congestion indicator flag during step 620 it also resets the timer in the corresponding entry of the congestion control database 500 to a predefined value, such as three minutes. The timer ensures that the information about congestion is up to date. The choice of 3 minutes is motivated by a study about the congestion in typical wide area networks showing that the duration of congestion is in the order of minutes.

Once a flag is set during step 620, the congestion control database maintenance process 600 will continuously decrease the timer during step 630 and perform a test during step 640 until the timer has expired. Once it is determined during step 640 that the timer has expired, then the congestion control database maintenance process 600 will reset the congestion indicator flag during step 650 and program control will terminate during step 660.

FIG. 7 is a flow chart describing an exemplary overload control process 700 incorporating features of the present invention and employed by the communication server 300 shown in FIG. 3. As previously indicated, the overload control process 700 processes each call set up request and determines if the requested path is congested. If the requested path is congested, then the overload control process 700 will forward the call using the secondary network 120.

As shown in FIG. 7, the overload control process 700 is initiated during step 710 upon receipt of a new call request. In the example shown in FIG. 7, the call request is received from a packet phone adapter 200 at site 2 and has a destination at a packet phone adapter 200 at site 3. The overload control process 700 then evaluates the corresponding entry in the congestion control database 500. In the example shown in FIG. 7, the entry (2, 3) is evaluated.

A test is then performed during step 730 to determine if the congestion indicator flag in the entry is set to one, indicating congestion on the path through the primary network. If it is determined during step 730 that the congestion indicator flag in the entry is not set to one, there is no congestion on the path through the primary network, and the call is accepted and forwarded on the primary network, such as the wide area network, during step 740.

If, however, it is determined during step 730 that the congestion indicator flag in the entry is set to one, there is congestion on the path through the primary network, and the overload control process 700 declares congestion on the path during step 750. In addition, in one preferred implementation, the call is forwarded through the secondary network 120, such as the public switched telephone network, rather than dropping the call. Program control then terminates.

It is to be understood that the embodiments and variations shown and described herein are merely illustrative of the principles of this invention and that various modifications may be implemented by those skilled in the art without departing from the scope and spirit of the invention.

We claim:

1. An overload control method for use in a multi-branch Internet Protocol-based private branch exchange system within a network environment having a primary network and at least one alternate network, said method comprising the steps of:

maintaining a congestion indicator status associated with each path in said primary network, said congestion indicator status indicating whether said path is congested and based on congestion data from at least one end unit device that participated in a packet telephony communication;

receiving a call set up request from a source terminal;

determining if a primary path between said source terminal and a destination terminal is congested using said congestion indicator status;

routing said call using said at least one alternate network if said primary path between said source terminal and a destination terminal is congested; and setting a timer that will cause said congestion indicator status to automatically expire after a predefined period of time, wherein said congestion indicator status and said timer are reset each time said congestion data is received from said at least one end unit device and wherein said timer expires after a period of time within which said congestion is expected to be alleviated.

2. A congestion management method for use in an Internet Protocol-based private branch exchange system within a packet network environment, said method comprising the steps of:

receiving congestion data from at least one end unit device that participated in a packet telephony communication;

determining if said congestion data indicates that a path associated with said packet telephony communication is congested;

setting a congestion indicator flag associated with said path if said congestion data indicates that a path associated with said packet telephony communication is congested; and setting a timer that will cause said congestion indicator flag to automatically expire after a predefined period of time, wherein said congestion indicator flag and said timer are reset each time said congestion data is received from said at least one end unit device and wherein said timer expires after a period of time within which said congestion is expected to be alleviated.

3. A congestion management method for use by an end unit packet phone adapter in a packet network environment, said method comprising the steps of:

collecting congestion data associated with a packet telephony communication;

determining if said packet telephony communication had a duration that exceeded a predefined threshold; and reporting said congestion data to a centralized server that performs overload control, whereby said centralized server evaluates said congestion data to determine if a path associated with said packet telephony communication is congested;

and sets a timer that will cause said determined congestion status to automatically expire after a predefined period of time, wherein said determined congestion status and said timer are reset by said centralized server each time said congestion data is reported and wherein said timer expires after a period of time within which said congestion is expected to be alleviated.

4. A congestion manager for use in an Internet Protocol-based private branch exchange system within a packet network environment, comprising:

a memory for storing computer readable code; and a processor operatively coupled to said memory, said processor configured to:

receive congestion data from at least one end unit device that participated in a packet telephony communication;

determine if said congestion data indicates that a path associated with said packet telephony communication is congested;

set a congestion indicator flag associated with said path if said congestion data indicates that a path associated with said packet telephony communication is congested; and maintain a timer that will cause said congestion indicator flag to automatically expire after a predefined period of time, wherein said congestion indicator flag and said timer are reset each time said congestion data is received from said at least one end unit device and wherein said timer expires after a period of time within which said congestion is expected to be alleviated.

* * * * *